Patented July 25, 1944

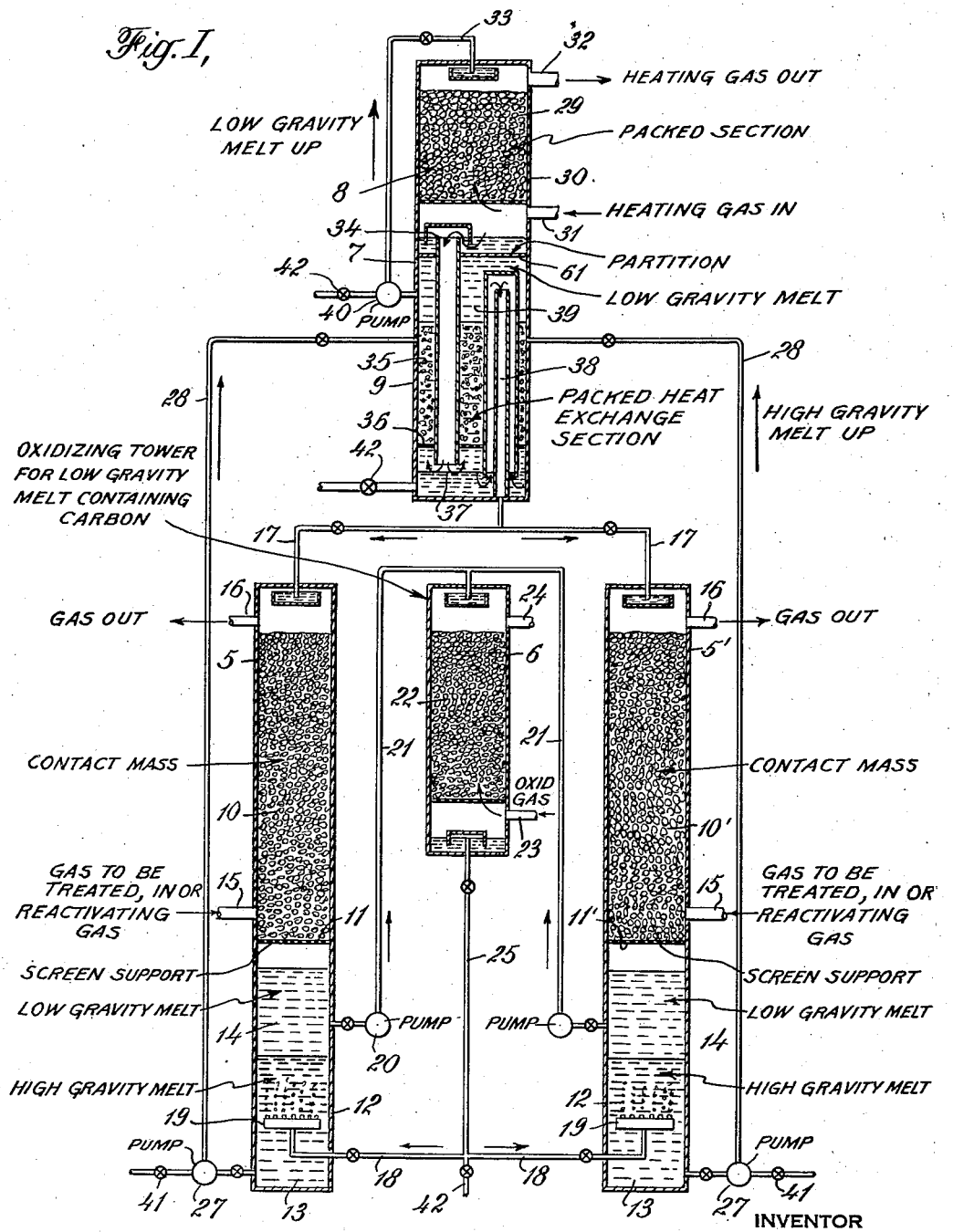

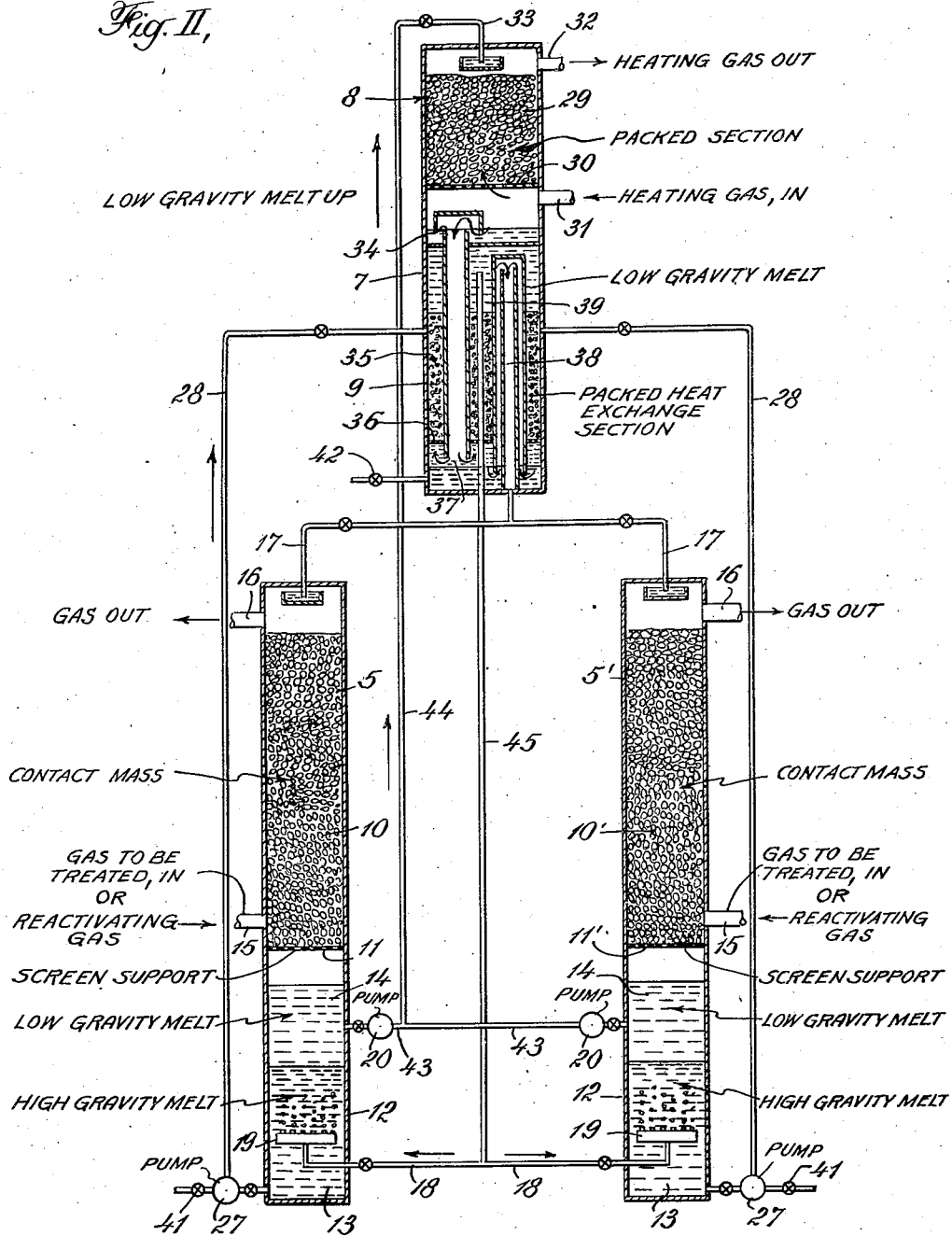

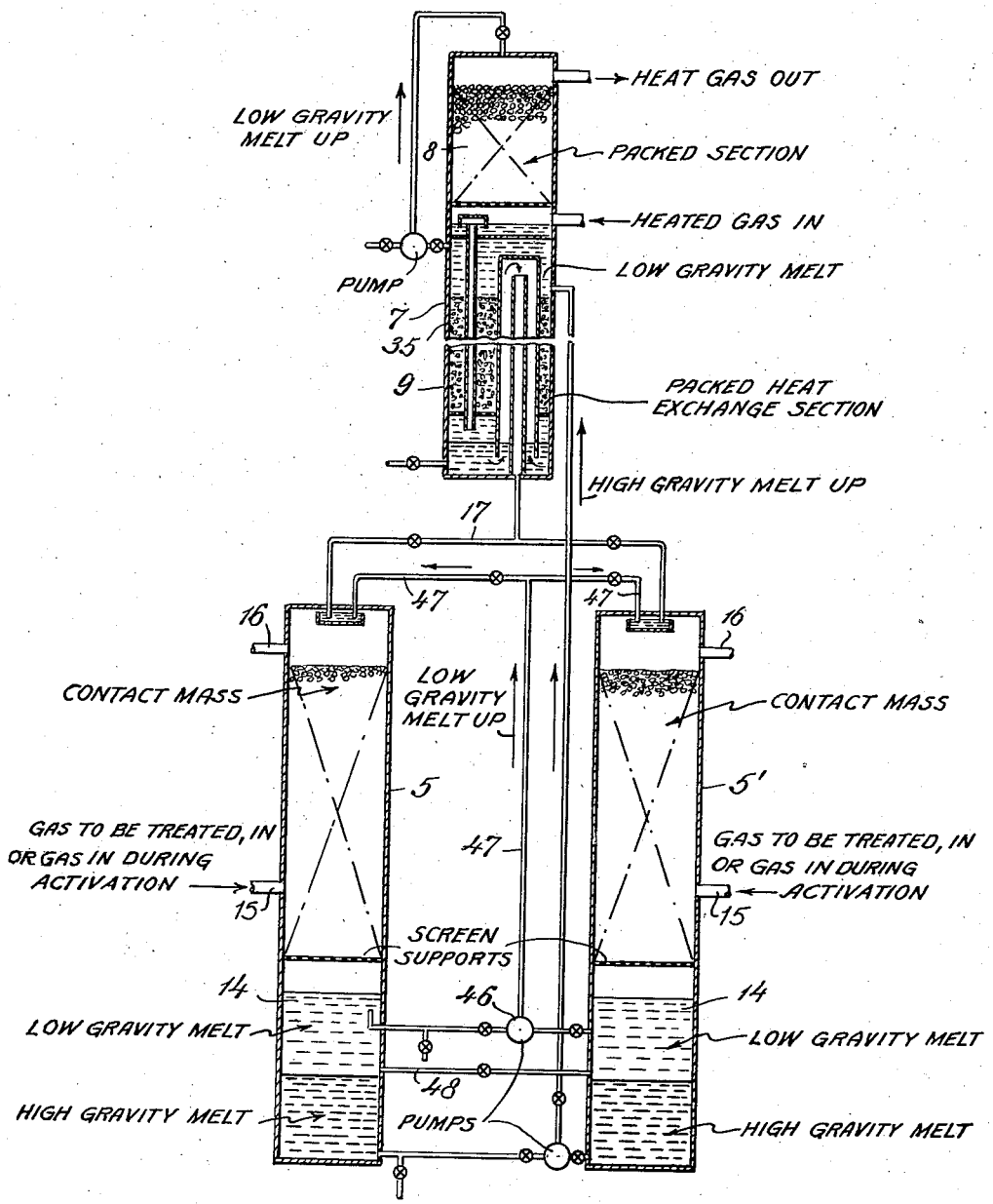

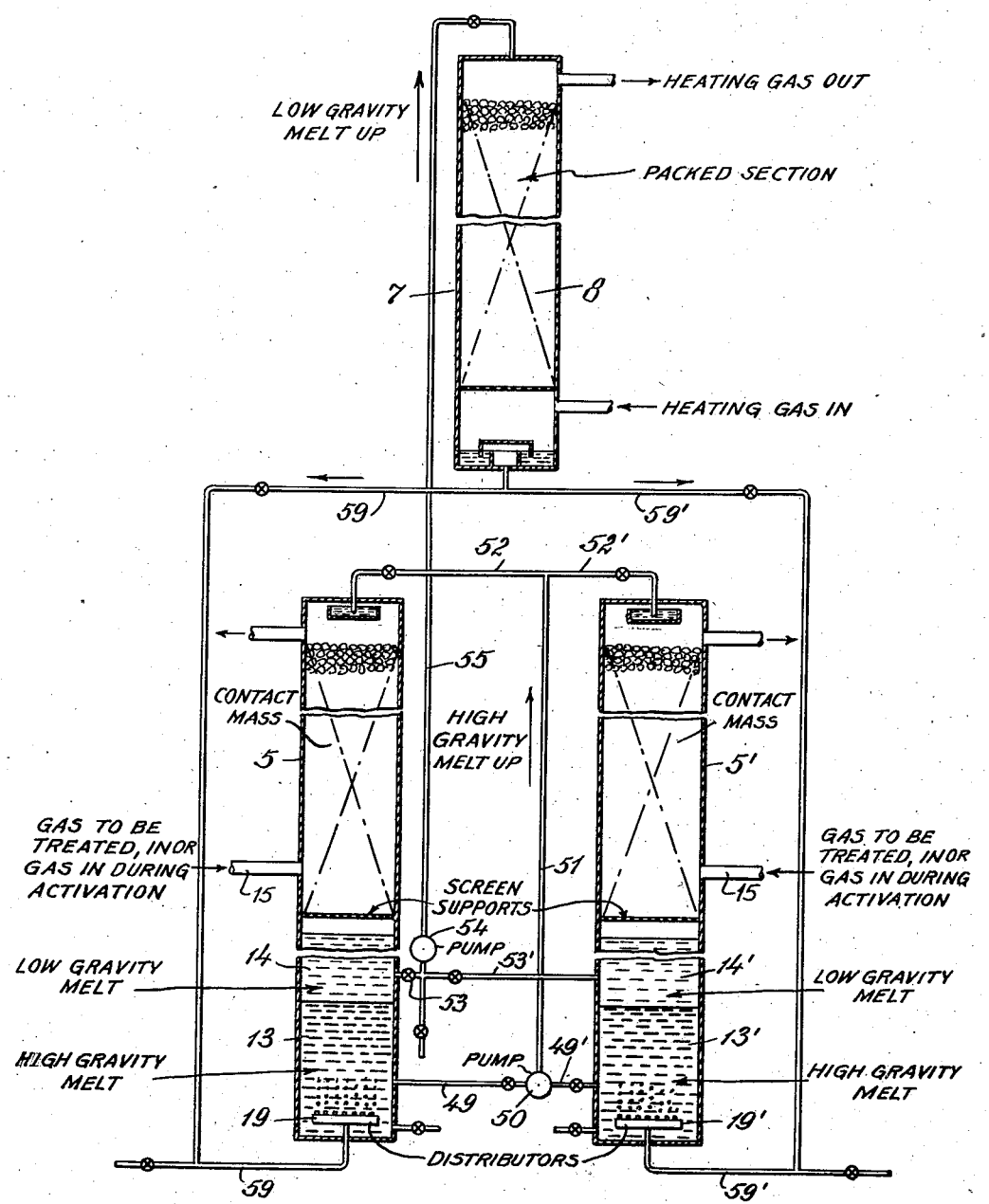

2,354,353

UNITED STATES PATENT OFFICE 2,354,353

METHOD AND APPARATUS FOR CATALYTIC CONVERSIONS

Armand J. Abrams, Dallas, Tex., assignor to Socony-Vacuum Oil Company, Incorporated, New York, N. Y., a corporation of New York Application January 4, 1941, Serial No. 373,075

19 Claims. (Cl. 196—52)

Numerous processes and apparatus setups have been proposed for the accomplishment of catalytic conversions of various materials in the vapor phase in the presence of a contact mass. One group of these processes and apparatus setups has to do with conversions wherein the material to be converted is contacted in the presence of some fluid, such as a molten metal, which itself may in some cases be a catalyst for the reaction, in the presence of contact bodies or spreading bodies, which bodies may be and usually are catalytic to the conversion. This invention has broadly to do with conversion processes of this general type.

In conversion processes of this general type used heretofore there are involved equipment setups in which heat is transferred through a confining wall, either to the catalytic material, or to the material to be treated, or to both.

This general practice of heat transmission through a confining wall, either to put heat into the zone containing the catalytic bodies as is the case in endothermic reactions or to remove heat from said zone as in the case in exothermic reactions, entails problems of heat exchange and of temperature control, the solution of which generally has involved special apparatus designs and temperature control methods of considerable complexity.

In addition it should be considered that this general practice of heat transfer through a confining wall, puts severe limitations on the temperature at which such catalytic reactions can be carried out, either on account of the cost of structural materials or on account of the secondary reactions induced by them at temperatures above those now used commercially. It is well known, for instance, that there are a number of refractory oxide catalysts and other similar inorganic catalysts for reactions of immediate importance to the petroleum industry, which do not sinter at temperatures well above those to which their use is restricted at present because of temperature limitations in materials of construction both as to strength and as to cost. These limitations are real drawbacks which affect considerably a more general commercial development of uses for the immense supplies of methane, ethane and propane.

Schemes in which in one cycle heat is imparted to a large continuous or discontinuous refractory heat storing mass, which heat is then used for treatment of the hydrocarbon fluid in another cycle by treating in the presence of this same heat containing mass, do not lend themselves readily to adaptation for use with catalytic masses.

This invention has for its principal object the provision of catalytic vapor phase conversion methods wherein conversion is accomplished by flowing reactants in contact with spreading material, which may be catalytic, and in contact with a heated liquid, which may be catalytic, in which heat control and transfer is effected by processes involving physical contact of heat supply media, heat transfer media, and heated media.

It has as a further object the provision of catalytic vapor phase processes as described wherein provisions for regeneration of spreading or solid contact material and regeneration of fluid contact material are each conducted under optimum conditions. It has as a further object the provision of catalytic vapor phase processes as described, wherein heat is supplied or removed from the reaction without the use of heat regenerators and without passing such heat through a confining wall. A further object is the provision of apparatus appropriate for such processes.

This invention is based upon the concept of method and apparatus wherein a material in the vapor phase is catalytically converted while flowing through a packed conversion zone, the packing of which may or may not be catalytic to the reaction, in the presence of a molten heat transfer material, which may or may not be catalytic to the reaction, which molten material flows, under non-flooding conditions, over the packing material without appreciably wetting it, and which molten material is one of a combination of two essentially dissimilar molten liquids used as heat transfer media.

The invention is useful in connection with any catalytic vapor phase conversion process, but since it appears most highly useful with hydrocarbon conversions, it will be discussed in connection therewith, without being limited thereto. In the field of hydrocarbon conversion it is applicable to a large number of catalytic conversion problems, such as catalytic cracking, dehydrogenation, cyclization, aromatization, polymerization, isomerization, alkylation and the like by the use of a combination of melts and catalyst bodies particularly suited for the particular conversion problem at hand.

Molten liquids in contact with catalysts have been proposed before but in all cases known the catalysts were either suspended or dissolved in the molten medium. This is an all important difference insofar that this process is operated under non-flooding conditions in which the solid catalyst is not appreciably wetted by the molten heat transfer medium and in which the catalyst therefore is able to function under entirely different conditions than in the processes above referred to. In some proposed processes, packed towers have been recommended for use in the treatment of hydrocarbons in the presence of molten materials but not in the presence of packings which had definite and appreciable catalytic properties and were used for an express catalytic purpose. Apparently no cases are on record of the use of inorganic melts or molten metals to convey heat directly to a packed tower environment containing an active catalyst compounded of various inorganic ingredients such as mixtures of oxides or sulfides, etc. On the contrary the belief seems to be held pretty generally that if leakage occurs in a catalytic converter from the heat transfer medium side to the section containing the catalyst, the catalyst efficiency is quickly destroyed or at least seriously impaired. To avoid such an outcome, engineering design studies have usually culminated in apparatus of considerable complexity.

The invention may be readily understood by reference to the drawings attached hereto, the four figures of which show several modifications of the process and apparatus of this invention, all in diagrammatic form.

Before discussing any of the figures, it may be helpful to restate the principle of operation, in which vaporous or gaseous materials, hereinafter spoken of as hydrocarbons, pass through a packed tower in contact with a molten material such as lead. The packing may be and preferably is catalytic to the reaction desired. The molten lead is passed through the tower in such quantities that it brings to the zone of reaction sufficient heat to accomplish the reaction, but in amounts insufficient to flood the tower. Outside the tower, the molten lead effluent therefrom is reheated by physical contact with a second hot molten fluid, such as, for example, a molten inorganic salt, which is immiscible with and of lower specific gravity than the lead. This salt is in turn heated by physical contact with gases of combustion.

Turning now to Figure 1, we find vessels 5 and 5', which are catalytic converters, vessel 6 which is a melt regenerator, and vessel 7, the upper part of which, 8, is a melt-heater and the lower part of which 9, is a heat exchange zone. Vessels 5 and 5' are identically equipped with a packed zone, 10—10', containing a packing of contact material catalytic to the desired reaction, supported by a screen or grid 11—11', below which there is a space 12 for separation of the two immiscible molten materials, the high gravity melt collecting at the bottom, 13, and the low gravity material collecting thereabove at 14. During reaction, vaporous hydrocarbons are introduced at 15 and reaction products are withdrawn at 16. During regeneration of the catalytic packing 10, regeneration medium is introduced at 15 and regeneration products are withdrawn at 16. During reaction, the high gravity melt, lead, is introduced in heated condition at the top of the conversion vessel 5 by pipe 17, and passes down over the packing material, 10, furnishing heat for reaction and is subsequently collected in space 13 at the bottom of vessel 5. In the usual conversion, the high gravity melt picks up carbon and similar materials from the reaction. To remove these from the high gravity melt, the low gravity melt is introduced to space 13 by pipe 18 and spreader 19, and in passing up through the heavy melt, the light melt scrubs the carbonaceous material therefrom, collecting it at 14. The light melt charged with this carbonaceous material is then removed from space 14 by pump 20, and is passed into regenerator 6 by pipe 21. Regenerator 6 has a packing of inert material, preferably a refractory, at 22. The light melt flows therein countercurrent to an oxidizing gas, introduced at 23 and removed at 24, and is freed of carbon and like impurities, returning to use by pipe 25. In order to supply heat for the process, the heavy melt is removed from space 13 by pump 27 and sent by means of pipe 28 to vessel 7, wherein the operation is as follows. Vessel 7 is divided by partition 61 into an upper part 8 and a lower part 9. In the upper part 8, there is an inert, refractory packing 29, supported by a screen or grid 30. Hot gases from a combustion are introduced at 31 and removed at 32. A second low gravity melt is introduced through pipe 33, picks up heat flowing through 29, and is removed through seal 34. Although usually of the same character as the first low gravity melt used in vessels 5 and 5', this second low gravity melt may be different in character, since the two circuits do not intercommunicate. In 9, the lower part of vessel 7, there is an inert, refractory packing 35, supported by 36. High gravity melt from pipe 28 flows downward through this packing. Hot low gravity melt from seal 34 is introduced at 37, below the packing and flows upward therethrough, heating the high gravity melt during its physical contact therewith. High gravity melt, now reheated, is withdrawn through seal 38 and returned to vessels 5 or 5'. Low gravity melt collects at 39 and is recirculated by pump 40.

The high gravity melt used is a molten metal or molten alloy of low melting point, non-reactive with the catalytic packing material and not capable of appreciably wetting it. This melt may be catalytic in the reaction being carried out, if desired. Many metals and alloys may be used, and of these lead is typical.

The low gravity melt must be resistant to oxidation, of different specific gravity from the high gravity melt, and not miscible therewith. Many materials, such as molten inorganic salts, may be so used.

The catalytic packing material in vessels 5 and 5' will usually be some form of refractory material which is itself catalytic to the reaction desired, or which may carry or be impregnated with catalytic material. A wide variety of such materials are now known. They may partake of the character of an association of alumina and silica, natural or synthetic in origin or may carry other catalytic materials. For example, a catalyst of alumina impregnated with chromic acid may be used for certain dehydrogenation reactions.

Turning back to Figure 1, it will be noted that the provision of two reaction vessels namely 5 and 5' permits of regenerating one vessel while the other is operating upon reaction.

It is understood that at the beginning of the operation the melts used may be introduced at such points as 41 and 42 shown in Figure 1 or other convenient points not shown. The melts or molten lead are preheated in one of several standard melting furnaces available for this purpose. At shutdowns the various melts would be returned by drainage or otherwise to their respective storage points, viz., melting pots, through lines and valves 41 and 42 or other convenient exit points not shown. It is also understood that the necessary transfer lines will be so heated as to prevent solidification of the molten fluids circulating therein.

The set-up shown in Figure 1 is one which is applicable when the process or choice of low gravity melts is such that it is inadvisable to use the same low gravity melt for carbon removal in vessels 5 and 5' and for heat storage in vessel 7. When the same low gravity melt may be used for both purposes, a simpler arrangement may be utilized, as shown in Figure II. In this Figure II, vessels 5, 5', and 7 are arranged and equipped exactly as they were in Figure I. Vessel 6 of Figure I is omitted. In Figure II low gravity melt from space 14 of vessel 5 is passed by pipes 43, 44 to the top of vessel 7, there to enter the heating zone 8. Under this arrangement this zone is utilized both for adding heat to the system and for burning carbon out of the low gravity melt. As before, the low gravity melt and high gravity melt interchange heat in 9 and reheated high gravity melt departs through pipes 17 to vessels 5 or 5'. Low gravity melt is returned from 9 to spreaders 19 by pipe 45.

In certain cases it is advantageous to remove carbon from the low gravity melt simultaneously with the regeneration of the catalytic packing material in vessels 5 or 5'. A convenient modification for this purpose is shown in Figure III. In Figure III, vessels 5, 5', and 7 are the same as before and with minor exceptions, equipped the same as before. The arrangements for heating high gravity melt in vessel 7 and recirculating it are the same as before. Only the low gravity melt circuit around vessel 5 is changed. In this Figure III low gravity melt is removed from spaces 14 by pump 46 and is returned by pipes 47 to flow over the packing material in vessels 5 or 5'. An intercommunicating pipe 48 is provided between spaces 14. Assuming the left hand vessel to be on reaction, and the right hand one to be regenerating, then low gravity melt will be taken from the space 14 of the left hand vessel, delivered to the top of the right hand vessel, and returned through pipe 48. In this fashion the same oxidizing gas which regenerates the contact mass in the right hand vessel will also regenerate the low gravity melt, i. e., free it of suspended carbon. In this setup, the spreaders 19 shown in Figures I and II are dispensed with, since the heavy melt can be scrubbed in its downward passage through the space 14 in the vessel which is on reaction.

In Figure IV a still more simplified setup is shown, applicable to situations such as in Figure III. Here vessels 5 and 5' are in general character and fittings the same as in previous figures, but of vessel 7 only the heating section 8 is retained. Assuming the left hand vessel 5 to be on reaction and the right hand vessel 5' to be on regeneration, operation will be as follows: High gravity melt will be removed from space 13 by pipe 49 and pump 50 to pass through pipes 51 and 52 to the top of 5, wherein it passes down through the tower, giving up heat to the reaction and otherwise acting as before, and collects in 13 at the bottom of 5. Low gravity melt is removed from 14 by pipe 53 and pump 54 to flow through pipe 55 into heating section 8 and is returned therefrom, after being heated and freed of suspended carbon, as in Figure II, by pipe 59 and introduced into 13 by spreader 19. The intimate contact of the two melts in spaces 13 and 14 accomplishes both the more important purpose of heat transfer and the secondary purpose of carbon scrubbing. During this period 5' has been regenerating. When 5' is placed upon reaction, the flow is correspondingly changed. High gravity melt will flow through 13', 49', 50, 51, 52', and low gravity melt through 53', 54, 55, 8, 59', 19', 13' and 14'.

It may be noted by comparison of these figures that all embody the basic principle of transferring heat into the reaction by physical contact, first between a hot gas and a low gravity melt, second by contact of the low gravity melt with a high gravity melt, and third by contact of the high gravity melt and the reactant. All of these transfers are of a type high in relative efficiency and entirely without the presence of limits imposed by enveloping or interventing materials of construction.

In its essentials, the concept of this process involves several operations, as detailed below. Circumstances permitting, some of these operations may be combined, as pointed out in previous discussion.

(1) Transfer of heat from a gas to a melt by physical contact.

(2) Transfer of heat from the first melt to a second melt by physical contact.

(3) Separation of the melts by utilization of differences in specific gravity.

(4) Conversion of vaporous reactants in passage over a suitable contact mass in the presence of the second melt as a heat transfer agent, this second melt being one which does not appreciably wet the contact mass, and being present in quantities insufficient to flood the conversion zone.

(5) Use of melts to remove entrained carbon and other solid or liquid products produced in the reaction zone and transfer them into an oxidizing zone.

(6) Oxidation of the carbon, etc., from the melt in an oxidizing zone.

(7) Regeneration of the contact mass in situ by means of an oxidizing gas.

The process may be used, for example, for such reactions as the dehydrogenation of propane to propylene using as contact mass an $Al_2O_3$-$Cr_2O_3$ catalyst in the presence of molten lead as a heavy melt. Below are shown the results of several experiments. In some of these experiments the catalyst was composed of pellets of activated alumina impregnated with a solution of chromic acid and dried. In others, the catalyst was prepared by co-precipitating aluminum and chromium hydroxides from solutions of the nitrates with ammonia, drying and pelleting. In both catalysts the concentration of $Cr_2O_3$ was 15 mol per cent.

Table I

|  | Space velocity | | | | | | |
|---|---|---|---|---|---|---|---|
|  | 3 | 6 | 11.2 | 12 | 14 | 18 | 22 |
| Volume percent propylene in exit gas—no lead | 10.5 | 15.5 | 19.9 | 20.0 | 18.3 | 14.9 | 13.4 |
| Volume percent propylene in exit gas—with lead | 16.0 | 17.5 | 19.9 | 19.5 | 17.7 | 16.2 | 15.3 |

Temperature 550° C.

The above experiments were run to determine the optimum space-velocity (volumes of gas reactant per volume of catalyst per unit of time, in this case cubic centimeters (at standard conditions) per cubic centimeter per minute) for either operation. While the best space velocity for both appears to be at about 11 to 12, note that the sensitivity of the reaction with lead is less pronounced.

Table II

A—Without lead
B—With lead
Temperature 550° C.
Space velocity 14

| Running time, minutes | Vol. percent propylene in exit gas | |
|---|---|---|
| | A | B |
| 40 | 17.2 | 18.2 |
| 100 | 17.8 | 18.9 |
| 160 | 17.3 | 19.2 |
| 220 | 16.0 | 17.8 |

Note the improved capacity for conversion in the presence of the high gravity melt, lead, other conditions being the same.

In both of these experiments the co-precipitated type of catalyst was utilized.

A third set of experiments was carried out to demonstrate that the regeneration of the catalyst in the presence of lead was without harmful effect upon the reaction. The general procedure was to carry out reaction for two hours, during which time samples were taken at convenient intervals. The catalyst was then regenerated with an oxidizing gas, a mixture of oxygen and nitrogen, and the cycle repeated. Table III shows exemplary results, taken at comparative points well into the operation.

Table III

A—Without lead
B—With lead
Temperature 550° C.
Space velocity 14
Catalyst-impregnated type

| A | | B | |
|---|---|---|---|
| Total elapsed time, minutes | Volume percent propylene in exit gas | Total elapsed time, minutes | Volume percent propylene in exit gas |
| 367 | 14.7 | 360 | 14.9 |
| Regeneration | | Regeneration | |
| 399 | 18.1 | 378 | 17.2 |
| 428 | 18.1 | 422 | 19.2 |
| 496 | 13.8 | 480 | 16.6 |
| Regeneration | | Regeneration | |

A very important advantage of the process herein disclosed arises from its ability, as shown, to avoid the economic and physical limitations laid upon other processes because of their necessity for reliance upon heat transferred through a confining wall of some variety, which heat must in turn be transferred through catalysts (usually materials of low heat conductivity) to particles of catalyst not in contact with the confining wall. That necessity is herein avoided by accomplishing heat transfer by physical contact.

An additional advantage arises from the action of the various melts in decreasing the amount of material deposited upon the contact mass, thus leading to higher rates of conversion and/or ability to maintain reaction at an economic level of conversion, for a longer period of time.

I claim:

1. A unitary process for the conversion of hydrocarbons in the presence of a contact mass followed by regeneration of the contact mass in situ comprising passing the hydrocarbons in vapor form and at conversion temperature through said contact mass, additionally flowing over said contact mass a high gravity fluid heat transfer medium selected from the group metals and metal alloys, in molten form, said fluid medium being present in amount insufficient to flood the interstices of the contact mass, said fluid medium being incapable of appreciably wetting said contact mass, contacting said high gravity fluid medium at a point external to said contact mass with a low gravity fluid medium selected from the group molten inorganic salts and mixtures of inorganic salts inert to oxidation, heating said low gravity fluid prior to contact with high gravity fluid by a physical contact of low gravity fluid and hot gases, periodically stopping the flow of hydrocarbons and high gravity fluid through said contact mass, passing regeneration gases therethrough and returning the regenerated contact mass to service.

2. The process of claim 1 in which, during regeneration of the contact mass, the low gravity fluid heat transfer medium is flowed over said contact mass during the passage of regenerating gases therethrough.

3. A process for the conversion of hydrocarbons in the presence of a contact mass comprising passing the hydrocarbons in vapor form and at conversion temperature through said contact mass, additionally flowing over said contact mass a high gravity fluid heat transfer medium selected from the group metals and metal alloys, in molten form, said fluid medium being present in amount insufficient to flood the interstices of the contact mass, said fluid medium being incapable of appreciably wetting said contact mass, contacting said high gravity fluid medium at a point external to said contact mass with a low gravity fluid medium selected from the group molten inorganic salts and mixtures of inorganic salts inert to oxidation for removal of carbonaceous matter from the high gravity liquid, circulating said low gravity fluid medium into contact with an oxidizing gas at a point external to its contact with heavy fluid medium and external to the reaction contact mass for removal of said carbonaceous matter from the low gravity liquid and returning such low gravity liquid to contact with the high gravity liquid, circulating the high gravity fluid medium to a point external to the reaction contact mass and there contacting the high gravity fluid medium with a second low gravity fluid medium to adjust the temperature of the high gravity fluid medium and returning the high gravity fluid medium to the reaction contact mass.

4. Apparatus for the conduct of hydrocarbon conversion in the presence of a contact mass comprising a reaction vessel, a contact mass in such vessel, inlet and exit means to pass hydrocarbon reactants and regeneration medium alternately therethrough, inlet and exit means to pass a first fluid heat exchange medium over said contact mass in physical contact therewith, liquid-liquid mixing means whereby said first fluid heat exchange medium may be intimately contacted with a second fluid heat exchange medium differing from the first in specific gravity, a gas-liquid contact vessel isolated from the reaction vessel, inlet and exit means to pass the second fluid heat exchange medium therethrough, conduits leading the second fluid from the gas-liquid contact vessel to the liquid-liquid mixing means and from the liquid-liquid mixing to the gas-liquid contact, and inlet and exit means whereby a heated gas may be led through the gas-liquid contact vessel.

5. Apparatus for the conduct of hydrocarbon conversion in the presence of a contact mass comprising a reaction vessel, a contact mass in such vessel, inlet and exit means to pass hydrocarbon reactants and regeneration medium alternately therethrough, inlet and exit means to pass a first fluid heat exchange medium over said contact mass in physical contact therewith, liquid-liquid mixing means whereby said first fluid heat exchange medium may be intimately contacted with a second fluid heat exchange medium differing from the first in specific gravity, a gas-liquid contact vessel isolated from the reaction vessel, inlet and exit means to pass the second fluid heat exchange medium therethrough, conduits leading the second fluid from the gas-liquid contact vessel to the liquid-liquid mixing means and from the liquid-liquid mixing to the gas-liquid contact, and inlet and exit means whereby a heated gas may be led through the gas-liquid contact vessel and in addition thereto, a heating zone external to the reaction vessel in which heat may be supplied to the first named fluid heat exchange medium, said heating zone being provided with pipe means whereby said first named fluid may be circulated between the reaction vessel and the heating zone.

6. A process for the conversion of hydrocarbons in the presence of a contact mass which comprises passing the hydrocarbons in gaseous form and under conversion conditions through said contact mass, additionally flowing over said contact mass a high gravity liquid heat transfer medium selected from the group consisting of molten metals and metal alloys, said liquid medium being present in amount insufficient to flood the voids of the contact mass and said liquid medium being incapable of appreciably wetting said contact mass, contacting said high gravity medium at a point external to said contact mass with a low gravity liquid medium selected from the group consisting of molten inorganic salts and mixtures of inorganic salts inert to oxidation, heating said low gravity liquid prior to contact with said high gravity liquid by a physical contact of such low gravity liquid with a gaseous medium, and returning said high gravity liquid after contact with said low gravity liquid to said contact mass.

7. The process of claim 6, wherein the contact mass comprises a catalyst for effecting said conversion reaction.

8. Apparatus for conducting hydrocarbon conversion in the presence of a catalytic contact mass comprising a plurality of reaction vessels, a catalytic contact mass in each of such vessels, inlet and exit means provided in each of such vessels for passing hydrocarbon reactants and regeneration medium alternately through each of such vessels, inlet and exit means in each of such vessels for passing a liquid heat exchange medium through said vessels in physical contact with the contact mass therein, liquid-liquid mixing means wherein a relatively high gravity liquid heat exchange medium may be intimately contacted with a relatively low gravity heat exchange medium, means for passing high gravity liquid from said liquid-liquid mixing means selectively to each of said vessels, means for passing said low gravity liquid from said liquid-liquid mixing means selectively to each of said vessels, and means for passing liquid heat exchange medium from each of said vessels to said liquid-liquid mixing means.

9. The process of converting hydrocarbons which comprises passing the hydrocarbons in a gaseous state under conversion conditions through a conversion zone containing a bed of contact material, flowing a liquid heat transfer medium through said zone in direct contact with said hydrocarbons but in insufficient amount to flood the voids of the bed, removing liquid heat transfer medium from said zone and reconditioning it for re-use in the conversion zone by direct contact with at least one other inorganic, oxidation resistant liquid medium, and then returning the reconditioned liquid heat transfer medium to the conversion zone.

10. The process of converting hydrocarbons which comprises passing the hydrocarbons in a gaseous state under conversion conditions through a conversion zone, flowing a liquid heat transferring medium of high gravity through said zone in direct contact with said hydrocarbons whereby heat is transferred to the hydrocarbons and carbonaceous residue produced as a by-product of the conversion is carried along in the liquid medium, removing liquid heat transfer medium from the conversion zone, scrubbing the removed medium in a scrubbing zone with a low gravity liquid medium which is immiscible with the high gravity medium and which is not sensitive to oxygen under combustion conditions thereby transferring the carbonaceous residue to the low gravity medium, directly contacting said removed high gravity medium with a heated liquid medium of low gravity and which is immiscible therewith to adjust the heat content of such high gravity medium for re-use in the conversion zone, and returning this heated, essentially carbon-free high gravity medium to the conversion zone.

11. The process of converting hydrocarbons which comprises passing the hydrocarbons in a gaseous state under conversion conditions through a conversion zone containing a bed of contact material, flowing a liquid heat transferring medium of high gravity through said zone in direct contact with said hydrocarbons but in insufficient amount to flood the voids of the bed whereby heat is transferred to the hydrocarbons and carbonaceous residue produced as a by-product of the conversion is carried along in the liquid medium, removing liquid heat transfer medium from the conversion zone, scrubbing the removed medium in a scrubbing zone with a low gravity liquid medium which is immiscible with the high gravity medium and which is not sentitive to oxygen under combustion conditions thereby transferring the carbonaceous residue to the low gravity medium, directly contacting said removed high gravity medium with a heated liquid medium of low gravity and which is immiscible therewith to adjust the heat content of such high gravity medium for re-use in the conversion zone, and returning this heated high gravity medium to the conversion zone.

12. The process of claim 10 wherein said contact material comprises a catalyst for effecting said conversion.

13. The process of claim 6 in which the gaseous medium contacted with the low gravity liquid is a combustion supporting gas whereby at least part of the heat supplied to heat the low gravity liquid will be supplied by the combustion of any combustible impurities in the low gravity liquid.

14. A process for the conversion of hydrocarbons which comprises passing the hydrocarbons in a gaseous state under conversion conditions through a conversion zone containing a catalytically active contact mass for effecting said conversion, additionally flowing over said contact mass a high gravity liquid heat tranfer medium selected from the group consisting of molten metal and metal alloys at a rate insufficient to flood the voids of said contact mass, said liquid medium being incapable of appreciably wetting said contact mass, whereby heat is transferred to the hydrocarbons and carbonaceous residue produced as a by-product of the conversion is carried along in the high gravity liquid medium, contacting said high gravity medium at a point external to said contact mass with a low gravity liquid medium selected from the group consisting of molten inorganic salts and mixtures of salts inert to oxidation thereby transferring the carbonaceous residue to the low gravity liquid, heating low gravity liquid which has previously been contacted with said high gravity liquid prior to its further contact with said high gravity liquid with a combustion supporting gas whereby at least part of the necessary heat will be furnished by combustion of the carbonaceous residue, and returning said high gravity liquid, after contact with said low gravity liquid to said contact mass.

15. A process for the conversion of hydrocarbons which comprises passing the hydrocarbons in a gaseous state under conversion conditions through a conversion zone containing a contact mass for effecting said conversion, additionally flowing over said contact mass a high gravity liquid heat transfer medium at a rate insufficient to flood the voids of said contact mass, said liquid medium being incapable of appreciably wetting said contact mass, whereby heat is transferred to the hydrocarbons and carbonaceous residue produced as a by-product of the conversion is carried along in the high gravity liquid medium, removing the high gravity liquid from the conversion zone, scrubbing the carbonaceous residue from the high gravity liquid by directly contacting it with a low gravity liquid medium selected from the group consisting of molten inorganic salts and mixtures of salts inert to oxidation, contacting the low gravity liquid medium with an oxidizing gas under combustion conditions to remove the carbonaceous residue from the low gravity liquid, reheating the high gravity liquid by directly contacting it with a low gravity liquid medium immiscible therewith and returning said high gravity liquid to said conversion zone.

16. The process of conducting a pyrogenic reaction which comprises passing a volatilizable organic compound in a gaseous state under conversion conditions through a conversion zone containing a bed of contact material, flowing a liquid heat transfer medium through said zone in direct contact with said organic compound, removing liquid heat transfer medium from said zone and reconditioning it for reuse in the conversion zone by direct contact with at least one other inorganic, oxidation resistant liquid medium, and then returning the reconditioned liquid heat transfer medium to the conversion zone.

17. The process of conducting a pyrogenic reaction which comprises passing a volatilizable organic compound in a gaseous state under conversion conditions through a conversion zone containing a bed of contact material, flowing a liquid heat transfer medium through said zone in direct contact with said organic compound but in insufficient amount to flood the voids of the bed, removing liquid heat transfer medium from said zone and reconditioning it for reuse in the conversion zone by direct contact with at least one other inorganic, oxidation resistant liquid medium, and then returning the reconditioned liquid heat transfer medium to the conversion zone.

18. The process of claim 16 wherein said contact material comprises a catalyst for effecting said conversion reaction.

19. Apparatus for conducting pyrogenic reactions involving volatilizable organic compounds in the presence of a contact mass comprising a reaction vessel, a contact mass in such vessel, inlet and exit means to pass the organic reactant in the vapor state through said reaction vessel, inlet and exit means to pass a first fluid heat exchange medium through said reaction vessel and over and in physical contact with the contact mass therein, liquid-liquid mixing means connected to said last mentioned inlet and exit means wherein said first fluid heat exchange medium may be intimately contacted with a second fluid heat exchange medium differing in specific gravity from the first, inlet and exit means in said liquid-liquid mixing means to permit the entry and exit of the second fluid medium, and means to maintain the temperature level of said second fluid.

ARMAND J. ABRAMS.